(12) United States Patent
Chou

(10) Patent No.: US 6,522,320 B1
(45) Date of Patent: Feb. 18, 2003

(54) CURSOR CONTROLLER

(75) Inventor: Chin-Wen Chou, Taipei (TW)

(73) Assignee: Shin Jiuh Corp., Taipei Hsien (TW)

( * ) Notice: Subject to any disclaimer, the term of this patent is extended or adjusted under 35 U.S.C. 154(b) by 0 days.

(21) Appl. No.: 09/537,558

(22) Filed: Mar. 30, 2000

(51) Int. Cl.$^7$ ................................................ G09G 5/08
(52) U.S. Cl. ...................... 345/157; 345/173; 345/174; 345/179; 178/18.01; 178/18.05
(58) Field of Search ................................ 345/156, 157, 345/158, 159, 160, 161, 173, 174, 175, 176, 177, 178, 179; 338/99; 178/18.01, 18.05

(56) References Cited

U.S. PATENT DOCUMENTS

| | | | |
|---|---|---|---|
| 4,319,078 A | * 3/1982 | Yokoo et al. ............ 178/18.05 |
| 4,651,123 A | * 3/1987 | Zepp ......................... 338/176 |
| 4,736,191 A | * 4/1988 | Matzke et al. ................ 341/20 |
| 4,790,968 A | * 12/1988 | Ohkawa et al. ............. 364/104 |
| 4,856,993 A | * 8/1989 | Maness et al. ................ 433/68 |
| 5,815,141 A | * 9/1998 | Phares ........................ 345/173 |

* cited by examiner

Primary Examiner—Steven Saras
Assistant Examiner—William C. Spencer
(74) Attorney, Agent, or Firm—Bacon & Thomas

(57) ABSTRACT

A cursor controller used to control displacement direction and speed of a cursor by changing equivalent capacitance comprises a conductive layer, two electrode layers and a press body. The electrode layers are attached to each face of the conductive layer respectively, wherein a plurality of electrode lines is formed on each electrode layer; one end of each electrode line is coupled with a resistor, and a vector zone is formed on each electrode layer at a section without connected resistor to cross each other perpendicularly in different orientations. An insulation portion is printed on a peripheral area of the electrode lines and on the resistors. The conductive layer and the electrode layers are glued together to form a thin-film printed circuit board. When the press body is pressed against the electrode layer the conductive layer will contact the electrode layers to effect a matrix output signal.

13 Claims, 6 Drawing Sheets

CURSOR CONTROLLER

BACKGROUND OF THE INVENTION

This invention relates generally to a cursor controller, particularly to a cursor controller that controls displacement direction and speed of a cursor by changing value of its equivalent resistance.

A joystick, a mouse, and a digital board are known different cursor controllers. As a disclosed patent of conventional cursor control device has revealed, a flexible touch-controlled board is disposed on a baseboard with a gap in-between, wherein a first and a second conductive surface are face-to-face formed on the baseboard and the touch-controlled board respectively. The first conductive surface is jointed with a common wire while the second is a conductive surface with resistance and is provided with a plurality of conductive contact points located peripherally in predetermined orientations. A touch-controlled key collar-jointed on the flexible touch-controlled board is pressed by different external forces to have the first and the second conductive surface conductively face-contacted with each other in different positions with different contact areas to result in different electrical characteristics for displacement control of a cursor in direction and in speed.

The above said cursor controllers can achieve the control function and efficacy of the cursor though, the value of resistance is too low with nonlinear change for the software to process output signals of the cursor smoothly and distinctly. Besides, the mentioned controllers usually cost much time and labor in fabrication with considerable thickness without matching with the thin-film printed circuit board in a conventional keyboard.

SUMMARY OF THE INVENTION

The primary object of this invention is to provide a cursor controller made in form of thin-film printed circuit board favorable for building software to process output signals from the cursor controller more sensitively and rapidly.

Another object of this invention is to provide a cursor controller made in a thin-film printed circuit board of a conventional keyboard for cost saving.

Yet another object of this invention is to provide a cursor controller with thinner thickness that can be assembled easily in relatively lower cost.

For realizing above said objects the cursor controller comprises a conductive layer two electrode layers, and a Dress body, wherein the electrode layer is disposed on each face of the conductive layer respectively. A plurality of electrode lines is formed on each electrode layer, and one end of each electrode line is connected with a resistor. A vector zone is reserved in each electrode layer in different orientations at a position where no resistor is connected, and those two vector zones are aligned perpendicular to each other in this case. An insulation portion is printed on circumference of the electrode lines or on the resistors, which the insulation layer is used to separate the resistors and the conductive layer and will not contact with the conductive layer under normal condition (without any external force applied onto the electrode lines). A positioning hole forming a positioning section is perforated in center of the conductive layer and the electrode layers, which are glued together to become a printed circuit board. By above said arrangement, when a press body is disposed on the electrode layer, a convex face of the press body can be inserted in the foregoing positioning section so that no offset will be created when the press body is pressed to enable the conductive layer and the electrode layers to contact each other and effect a matrix output signal.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which.

DETAILED DESCRIPTION OF THE PREFERRED EMBODIMENT

Figure 1:
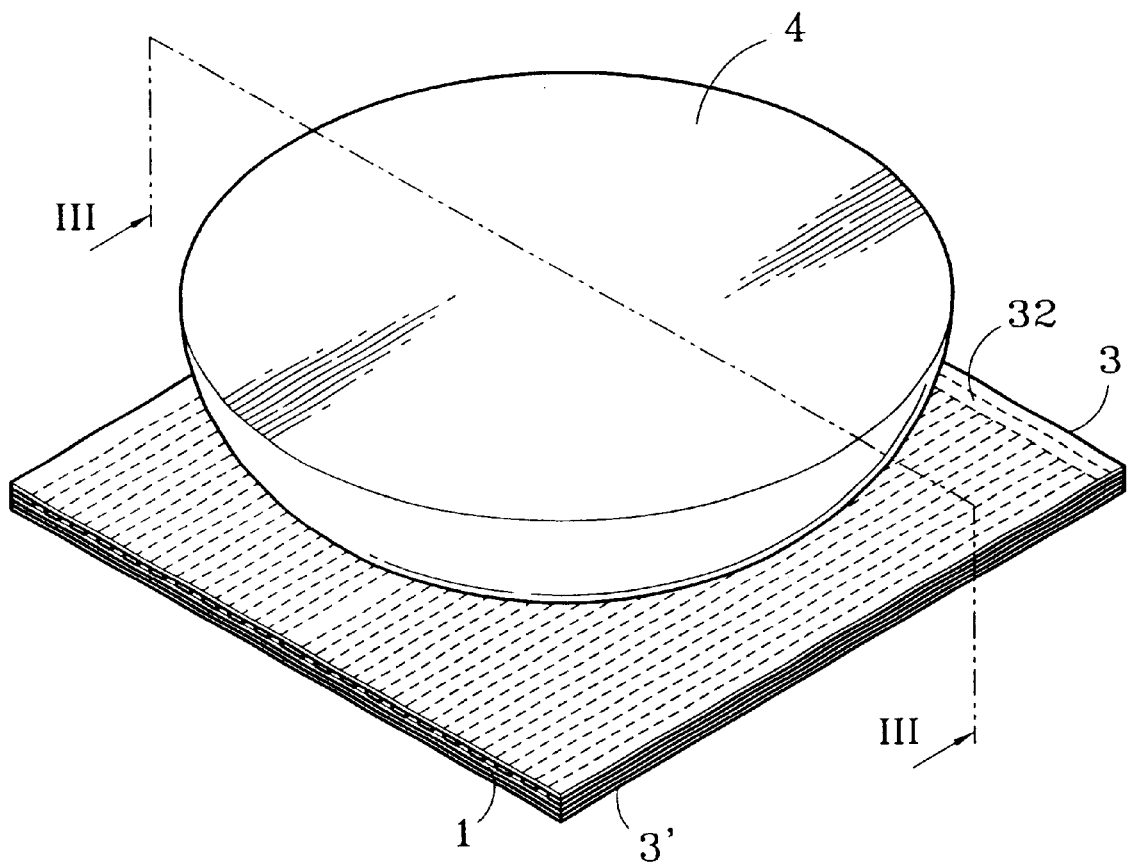
FIG. 1 is schematic elevational view of a first embodiment of this invention.
Figure 2:
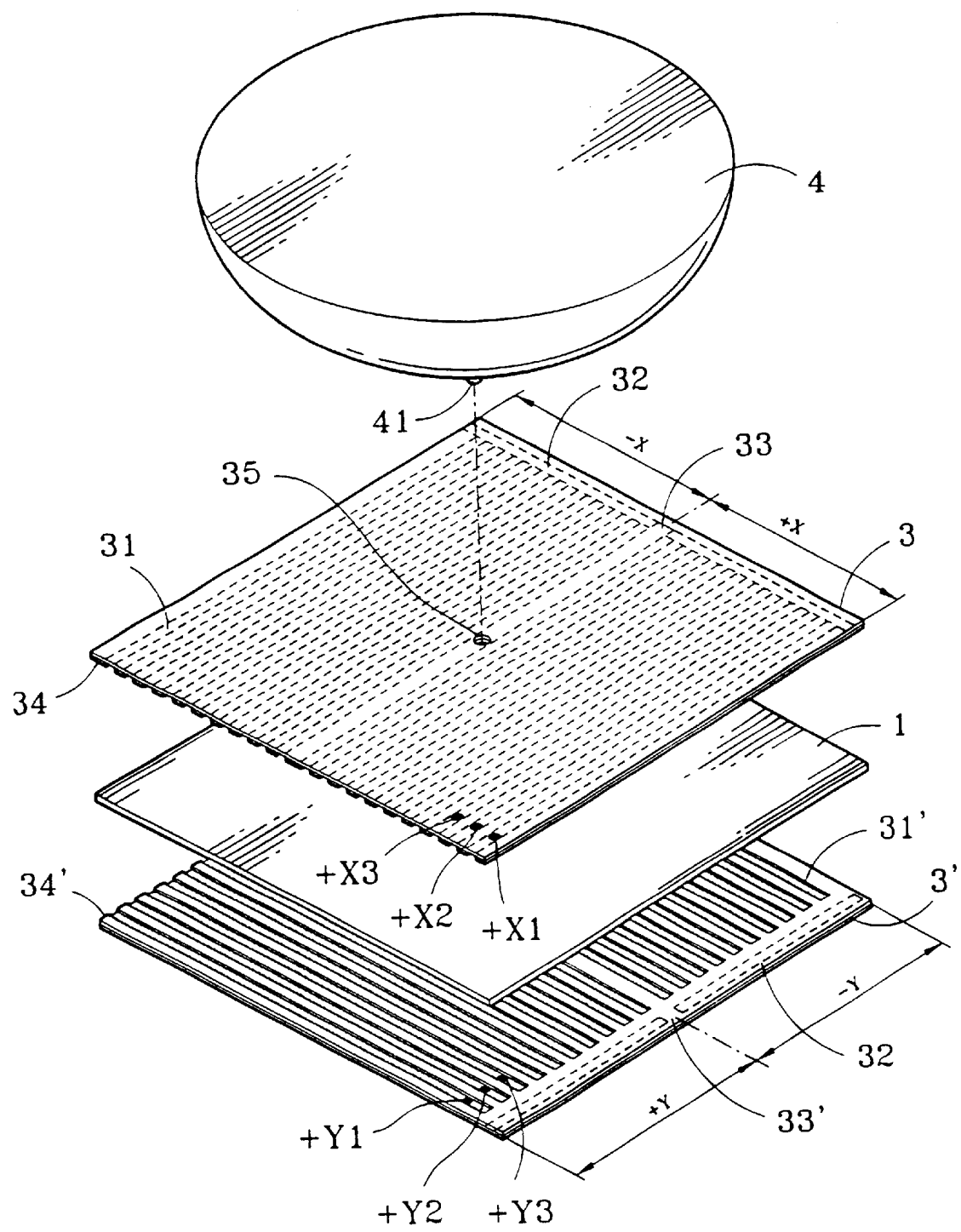
FIG. 2 is a schematic exploded view of FIG. 1.
Figure 3:
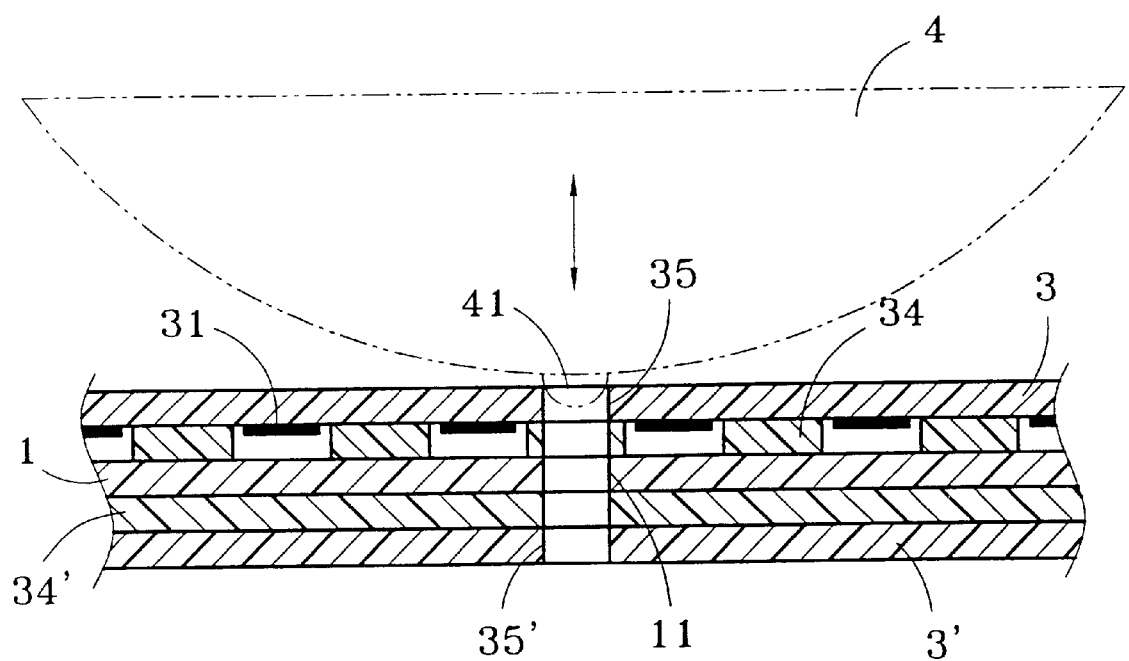
FIG. 3 is a cutaway sectional view taken along line III—III in FIG. 1.

As shown in FIGS. 1, 2, and 3 in a first embodiment of this invention, a cursor controller used to control direction and speed of a cursor by changing equivalent resistance mainly comprises a conductive layer 1, two electrode layers 3, 3', and a press body 4. Those two electrode layers 3, 3' made of resilient plastics are attached respectively on two faces of the conductive layer 1 ID made of a conductive material of soft silicon gel, wherein a plurality of electrode lines 31, 31' is formed on each electrode layer 3, 3'. A resistor 32, 32' is coupled to one end of each electrode line 31, 31', and two vector zones are formed in different (perpendicular in this case) orientations at sections 33, 33' where no resistor is connected to the electrode line 31, 31'. In distribution of the resistors 32, 32', at the outer position the resistor 32, 32' is placed, the smaller is the value of the resistor 32, 32', and an insulation portion 34, 34' is printed on peripheral area of the electrode lines 31, 31' and on surface of the resistors 32, 32'. The insulation portion 34, 34', which is used to separate the resistors 32, 32' from the conductive layer 1, will not contact the conductive layer A if no external force is applied onto the electrode lines 31, 31'. Besides, a positioning hole 11, 35, 35' is perforated in center of the conductive layer 1 and the electrode layers 3, 3' to form a positioning section respectively so that a positioning portion 41 on a convex face of the press body 4 can be inserted in the positioning section when it is placed on the electrode layer 3, or, the circumference of the press body 4 may be fixed to avoid any offset when it is pressed to allow the electrode layer 3, 3' to contact the conductive layer 1 smoothly and transmit a displacement signal.

Referring to FIGS. 2 and 3, we assume the electrode layers 3, 3' are vectors in X-axis and Y-axis respectively, wherein the vector in X-axis may be further divided into vector in X-axis and -X-axis, and similarly, vector in Y-axis into vector in +Y-axis and -Y-axis. When an external force is applied onto the press body 4, the press body 4 will roll on the electrode layer 3 to enable the electrode lines 31, 31' of the electrode layer 3, 3' to contact with the conductive layer 1 and create a matrix signal for the software to process and control displacement direction and speed of the cursor.

When the convex face of the press body 4 is pressed against the electrode layer 3, 3' and if a plurality of the electrode lines 31, 31' is pressed meanwhile the electrode line 31, 31' with the lowest resistance value will be taken as the output line. For example, when the convex face of the press body 4 contacts with +X1, +X2, +X3 and +Y1, +Y2, +Y3 simultaneously, as the lowest resistance value is distributed to +X1 and +Y1, hence, the electrode lines 31, 31' corresponding to +X1 and +Y1 are taken as output lines for creating a matrix output signal to the software for control of the cursor.

Figure 4:
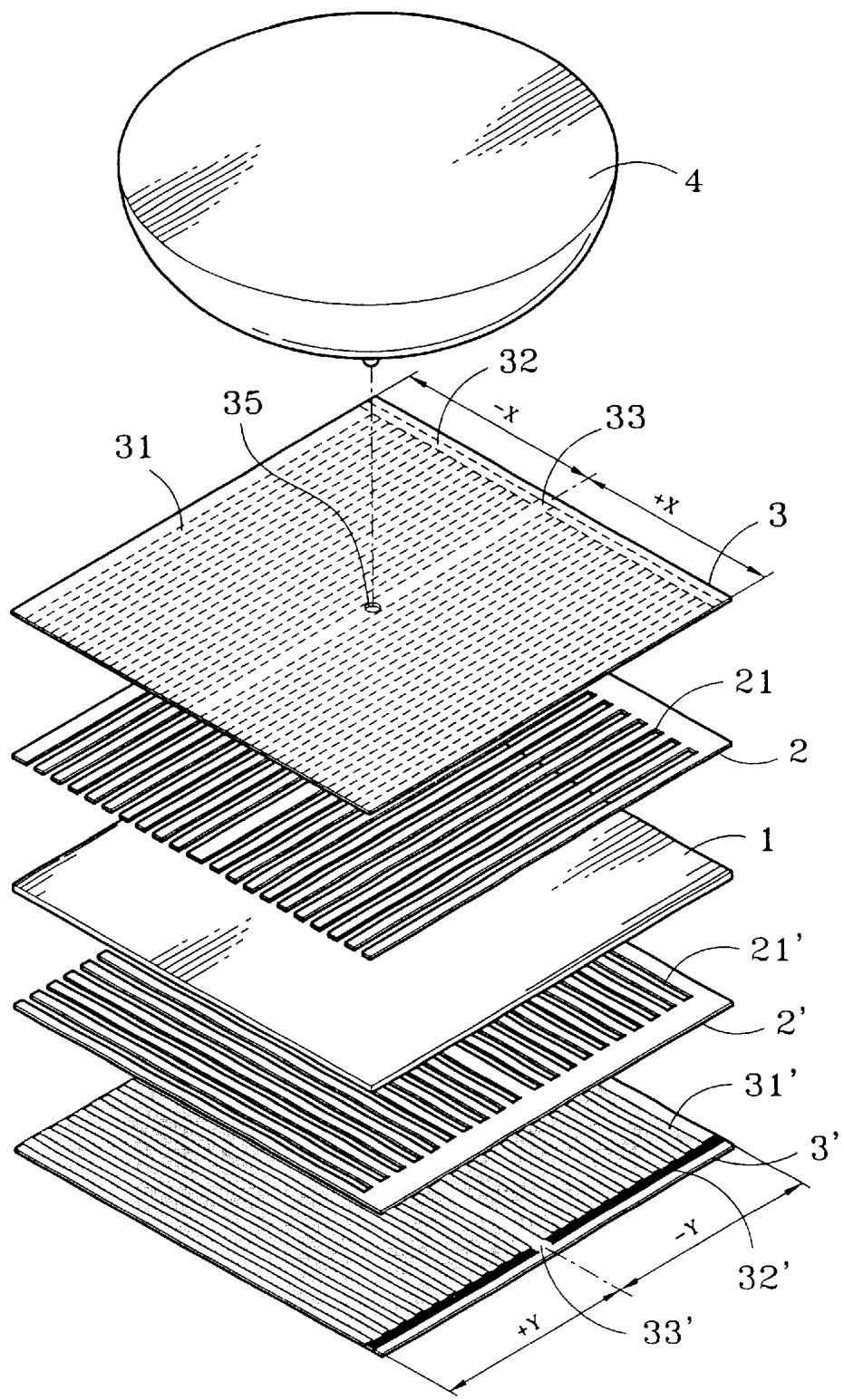
FIG. 4 is a schematic view of a second embodiment of this invention.

In a second embodiment of this invention shown in FIG. 4 the foregoing insulation portion 34, 34' consists of two pieces of plastics-made thin-film body 2, 2' disposed between the electrode layers 3, 3' and the conductive layer 1 respectively. A plurality of channels 21, 21' is formed in each thin-film body 2, 2' at positions corresponding to that of the electrode lines 31, 31'. When the press body 4 is pressed onto The electrode layer 3, the electrode lines 31, 31' are permitted to pass through the channels 21, 21' to contact with the conductive layer 1 create a matrix output signal.

Figure 5:
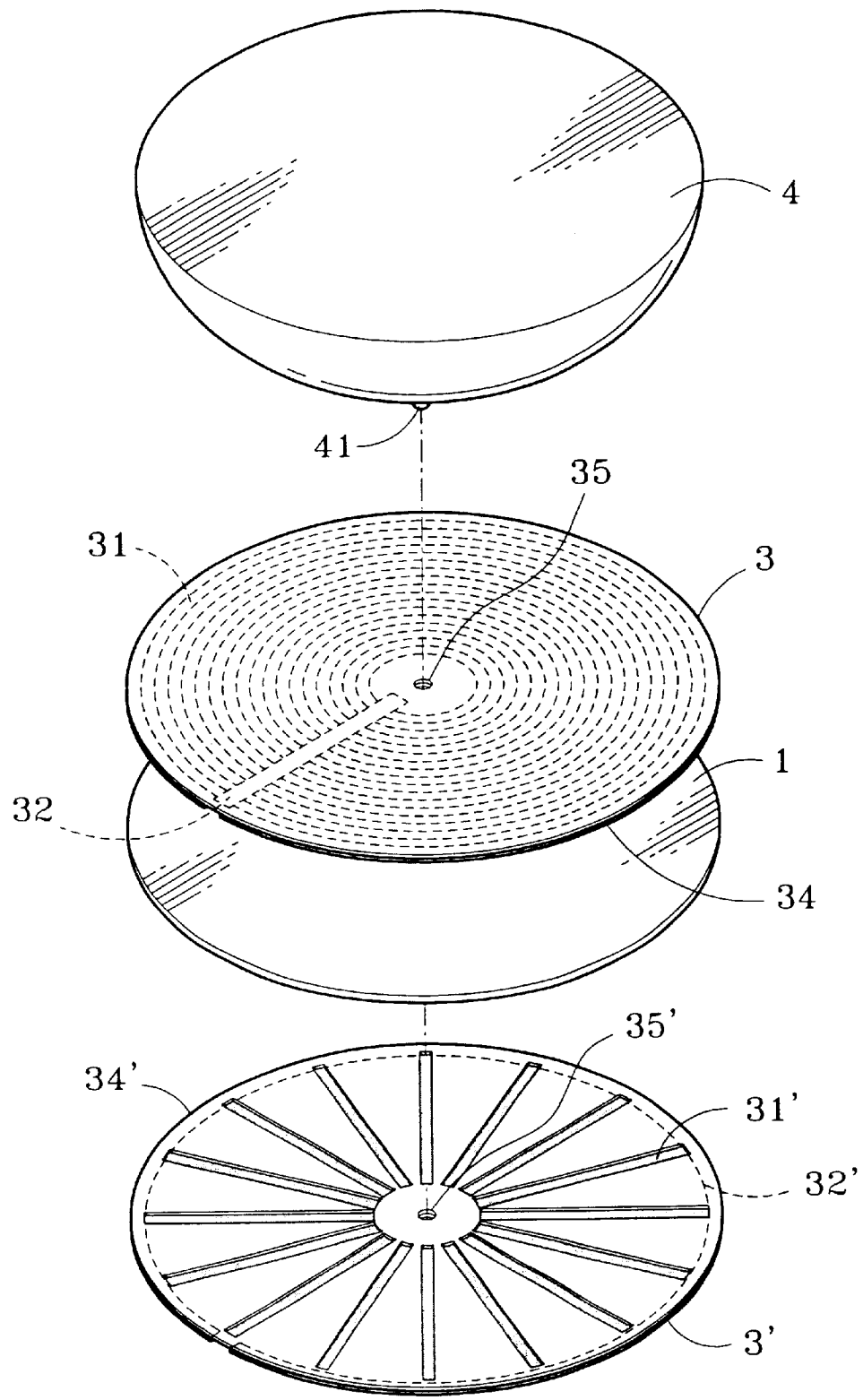
FIG. 5 is a schematic view of a third embodiment of this invention.
Figure 6:
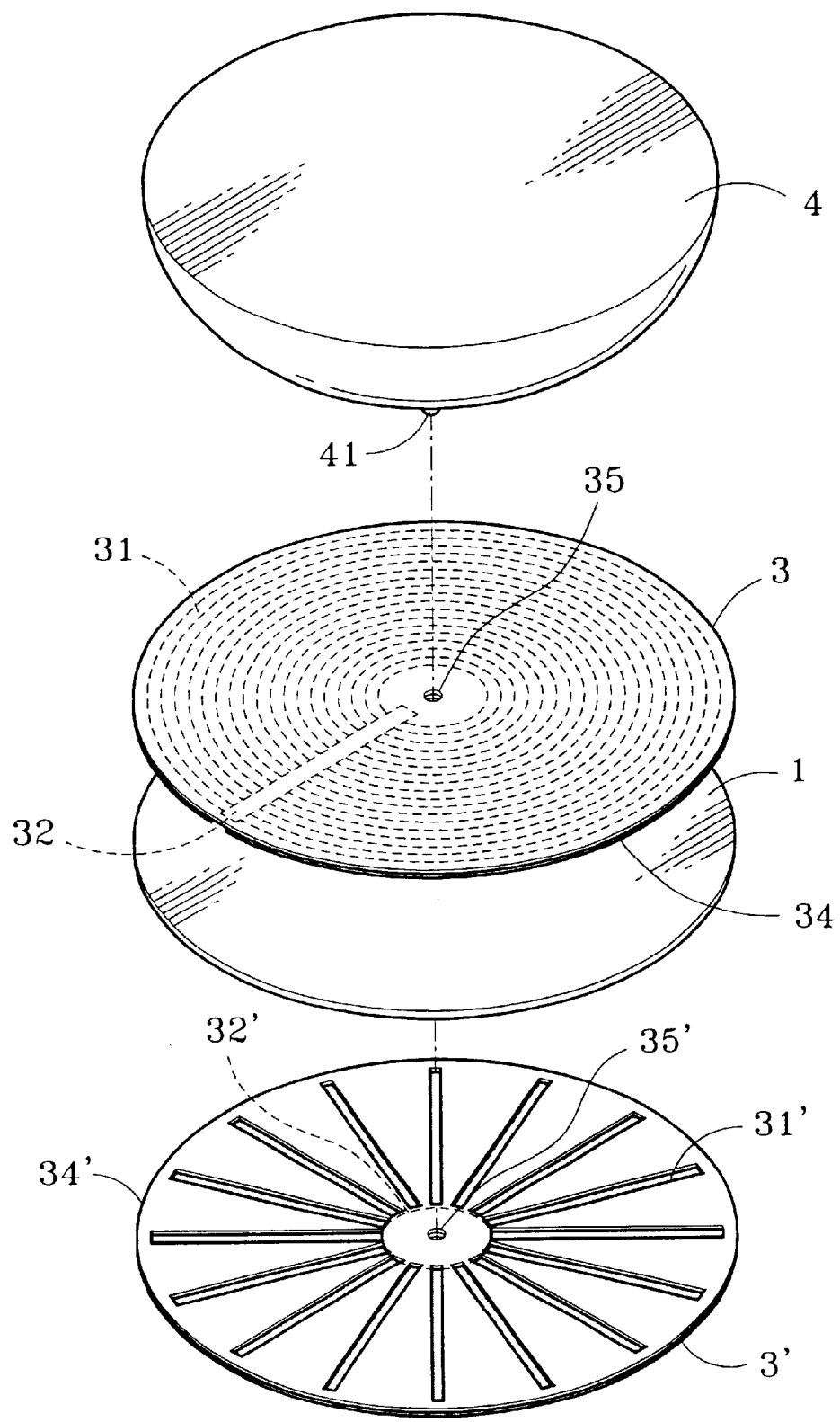
FIG. 6 is a schematic view of a fourth embodiment of this invention.

As shown in FIGS. 5 and 6 in a third and a fourth embodiment of this invention the foregoing electrode layer 3, 3' may be expressed in polar coordinates or other curves for improving linear characteristics. A plurality of electrode loops 31 is formed on the electrode layer 3, and a resistor 32 is printed at an optimum position in the loops. A plurality of radial electrode lines 31' is arranged on the electrode layer 3', and a resistor 32' is printed on the electrode layer 3' at center or at rim of the radial electrode lines 31'. We assume that R represents the electrode layer 3 and θ represents the electrode layer 3', then, a coordinate output signal (X=R cos θ, Y=R sin θ) is obtainable when the electrode layers 3, 3' are pressed.

As the cursor controller is made in form of a thin-film printed circuit board, it is advantageous in: establishing software for processing output signals from the printed circuit board; enhancing nimbleness of the cursor in displacement direction and speed; thinning thickness of the printed circuit board; saving fabrication cost; and, simplifying fabrication process b) combining the printed circuit board of the cursor controller with the thin-film printed circuit board in a conventional keyboard.

Although, this invention has been described in terms of preferred embodiments, it is apparent that numerous variations and modifications may be made without departing from the true spirit and scope thereof, as set forth in the following claims.

What is claimed is:

1. A cursor controller used for controlling displacement direction and speed of a cursor by changing equivalent resistance, the cursor controller comprising:

a conductive layer;

two electrode layers attached on two faces of said conductive layer respectively, wherein a plurality of electrode lines are formed on each electrode layer;

one end of each electrode line is connected with a resistor, and a section without any resistor connected thereto forms a vector zone on each electrode layer, wherein the two vector zones are aligned in different orientations;

an insulation portion is formed at circumference of said electrode lines or on the resistors;

the electrode lines on said electrode layers being contacted with said conductive layer to effect a matrix output signal for controlling the displacement direction and speed of the cursor when an external article is applied to press against one of said electrode layers; and wherein said external article is a press body with a convex face having a positioning portion.

2. The cursor controller according to claim 1, wherein said conductive layer is made of a conductive material of soft silicon gel.

3. The cursor controller according to claim 1, wherein said press body may be positioned with its circumferential structure.

4. The cursor controller according to claim 1, wherein said insulation portion is composed of two pieces of thin-film body disposed respectively in between said electrode layers and said conductive layer, and a plurality of channels is formed on each said thin-film body.

5. The cursor controller according to claim 4, wherein said thin-film body is made of a soft plastic material.

6. The cursor controller according to claim 1, wherein said electrode layers are made of a resilient soft plastic material.

7. The cursor controller according to claim 1, wherein those two electrode layers are assumed as a X-axis and a Y-axis respectively.

8. The cursor controller according to claim 7, wherein said X-axis may be further divided into two vectors, namely, +X-axis and −X-axis.

9. The cursor controller according to claim 7, wherein said Y-axis may be further divided into two vectors, namely, +Y-axis and −Y-axis.

10. The cursor controller according to claim 1, wherein a positioning hole is perforated in said conductive layer and said electrode layers to form a positioning section respectively.

11. The cursor controller according to claim 1, wherein polar coordinates or other curves may be adopted to said electrode layers for improving linear characteristics.

12. The cursor controller according to claim 11, wherein a plurality of electrode lines on said electrode layer is formed in loops, and a resistor is printed on a optimum position of the loops while a plurality of radial electrode lines is formed on said electrode layer; and, a resistor is printed at rim or center of said radial electrode lines.

13. The cursor controller according to claim 1, wherein the two vector zones are aligned perpendicular to one another.

* * * * *